UNITED STATES PATENT OFFICE.

LOUIS HILL, OF WATERBURY, CONNECTICUT.

COMPOUND FOR INSULATING ELECTRIC WIRES.

SPECIFICATION forming part of Letters Patent No. 472,352, dated April 5, 1892.

Application filed July 11, 1891. Serial No. 399,228. (No specimens.)

*To all whom it may concern:*

Be it known that I, LOUIS HILL, a citizen of Waterbury, in the county of New Haven and State of Connecticut, have invented a new and useful Compound for Insulating Electric Wires; and I do hereby declare the following to be a full, clear, and exact description of the invention, such as will enable others skilled in the art to which it appertains to make and use the same.

My invention relates to an improvement in material for insulating and coating electric wires.

The object of my invention is to produce material for the purpose specified which shall be effectual in the performance of its functions.

With this object in view the invention consists in composition of matter as hereinafter set forth, and pointed out in the claim.

In preparing my improved insulating compound I take of pittizite pitch, one pound; candle-tar, one pound; coal-tar, one pound; asphalt pitch, one-half pound; rosin, one-half pound. These ingredients I thoroughly mix together, and with the compound thus produced I cover the wire to be insulated.

Having fully described my invention, what I claim as new, and desire to secure by Letters Patent, is—

A compound for insulating wire, consisting of pittizite pitch, candle-tar, coal-tar, asphalt pitch, and rosin, substantially as set forth.

In testimony whereof I have signed this specification in the presence of two subscribing witnesses.

LOUIS HILL.

Witnesses:
WM. J. SCHLEGEL,
EDWARD F. COLE.